US010461555B2

(12) United States Patent
Eftimie et al.

(10) Patent No.: US 10,461,555 B2
(45) Date of Patent: Oct. 29, 2019

(54) BATTERY CHARGING FOR MOBILE DEVICES

(71) Applicant: Dialog Semiconductor (UK) Limited, London (GB)

(72) Inventors: Sabin Eftimie, San Jose, CA (US); Lasse Harju, Munich (DE); Manfred Kogler, Grobenzell (AT); Amit Bavisi, Los Gatos, CA (US); Sorin Negru, San Jose, CA (US)

(73) Assignee: Dialog Semiconductor (UK) Limited, London (GB)

( * ) Notice: Subject to any disclaimer, the term of this patent is extended or adjusted under 35 U.S.C. 154(b) by 107 days.

(21) Appl. No.: 15/598,558

(22) Filed: May 18, 2017

(65) Prior Publication Data

US 2018/0337541 A1 Nov. 22, 2018

(51) Int. Cl.
*H02J 7/00* (2006.01)
(52) U.S. Cl.
CPC ..... *H02J 7/0052* (2013.01); *H02J 2007/0059* (2013.01); *H02J 2007/0062* (2013.01)
(58) Field of Classification Search
CPC .............................. H02J 7/0044; H02J 7/0052
USPC ........................................................ 320/107
See application file for complete search history.

(56) References Cited

U.S. PATENT DOCUMENTS

| 9,400,546 | B1 | 7/2016 | Agarwal et al. |
| 2003/0085711 | A1 | 5/2003 | Takagi |
| 2012/0176361 | A1 | 7/2012 | Lee et al. |
| 2015/0054493 | A1 | 2/2015 | Muench et al. |
| 2015/0285872 | A1 | 10/2015 | Chung et al. |
| 2016/0226283 | A1* | 8/2016 | Nge .......................... G06F 1/26 |
| 2016/0268731 | A1* | 9/2016 | Ziegenfuss ........... H02J 7/0045 |
| 2017/0063251 | A1* | 3/2017 | Ye ...................... H02M 3/33576 |
| 2017/0264122 | A1* | 9/2017 | Greening .............. H02J 7/0052 |
| 2018/0309372 | A1* | 10/2018 | Leong ............... H02M 3/33546 |

FOREIGN PATENT DOCUMENTS

| CN | 203574422 | 4/2014 |
| KR | 101658367 | 9/2016 |

* cited by examiner

*Primary Examiner* — Suchin Parihar
(74) *Attorney, Agent, or Firm* — Saile Ackerman LLC; Stephen B. Ackerman

(57) ABSTRACT

A wired connection, such as USB-C, for charging a sink from a source, has a configuration channel and a power transmission channel. The presence of data on the configuration channel is used to determine that a cable has been disconnected from the power source. This charging system contains a capacitive power converter and a controller for controlling the capacitive power converter. There is also a configuration channel detector, which is arranged to detect the status of the configuration channel and to provide this status to the controller, so that the system can determine that the source has been detached from the bus when no configuration channel data is present.

25 Claims, 5 Drawing Sheets

BATTERY CHARGING FOR MOBILE DEVICES

TECHNICAL FIELD

The present disclosure relates to battery charging for mobile devices, and especially to charging using a switched capacitive power converter.

BACKGROUND

It is known to connect devices via a cable to transmit power between them, the device that provides power acting as a power source and the device that receives power acting as a power sink. In this context, a "cable" can comprise any solid physical conducting conduit between devices (a wireless connection that transmits data or power through atmospheric space is outside the definition of a "cable"). One common example of this is the connection of a mobile device such as a cellular telephone or tablet computer with a charger so that a battery of the mobile device can be charged.

The Universal Serial Bus (USB) standard defines cables, connectors and communications protocols for use in connecting hosts and devices, for example, connecting peripheral devices to a desktop or laptop computer. A USB connection between devices can be used both for the exchange of data and also for the transmission of power, which can be for charging mobile devices. When charging, the USB host will usually function as a power source and the USB device as a power sink although these roles can in some cases be reversed. The mobile device comprises a battery which acts as a power sink and can be charged when connected via the bus to the host. The host may be another device such as a desktop or laptop computer that acts as a power source, or it may comprise a charger plug which can plug into a mains electricity source.

In a cable connection between devices, it is important to determine when the power source is attached or detached from a system, so that charging and operational aspects of the connected device can be adjusted in the desired manner. In particular, it is desirable to accurately and quickly detect when a power source has been detached, to make sure that there are no dangerous or undesirable electrical conditions created at the side of the power sink.

In a cable connection between devices, there will be a channel for transmitting power. The channel may comprise a physical wired connection provided by the bus. A detachment of the source is detected when a voltage associated with this power transmission channel falls below a predetermined threshold.

This works for many scenarios, but there is a problem when it comes to the use of capacitive power converters when charging.

A capacitive power converter comprises a DC-DC converter that can change an input voltage or current to a different output voltage or current using capacitive elements for the storage of charge, instead of non-capacitive energy storage elements such as inductors or transformers. An example of a capacitive power converter is a charge pump.

In a charging context as discussed above, the energy of the battery can back-boost (or reverse boost) the energy storage elements of a capacitive power converter after a cable is detached. The capacitive power converter is lacking an input power source and so it is using the battery's power from the output to supply the power for the input. The transfer of energy is reversed in this case, coming from the output towards the input. This means that the voltage of the power transmission channel does not fall, or at least does not fall enough to trigger the detection of a detachment. In this case, the battery effectively becomes a power source and starts to be depleted while switching operations of the capacitive power converter continue. The subsequent provision of power to the input side of the capacitive power converter (reverse-boost or back-boost) which may create dangerous conditions in the mobile device or system that hosts the battery.

SUMMARY

It is therefore desirable to provide other ways of detecting a detachment of a power source from a data bus connection between a host and a device when the device comprises a battery that is being charged by a capacitive power converter.

The present disclosure applies in particular, but not exclusively, to a universal serial bus (USB) connection between a host and a device, and even more particularly to a USB Type-C connection. According to a first aspect of the disclosure, there is provided a charging system for providing power over a bus between a source and a sink said bus comprising a power transmission channel and a configuration channel; said system comprising: a capacitive power converter; a controller for controlling operation of the capacitive power converter; a configuration channel detector arranged to detect the status of the configuration channel and provide said status as an input for the controller, so that the system can determine that the source has been detached from the bus when no configuration channel data is present.

Optionally, the configuration channel detector is arranged to detect a voltage associated with the configuration channel and said status is detected and provided based on when the detected voltage crosses a predetermined threshold.

Optionally, the configuration channel comprises a first configuration channel conduit and a second configuration channel conduit; and the configuration channel detector detects a first voltage associated with said first configuration channel conduit and a second voltage associated with said second configuration channel conduit, and provides said status based on said detected first voltage and said detected second voltage.

Optionally, the configuration channel detector comprises a first comparator receiving a voltage from the first configuration channel conduit at a first input and a reference voltage at a second input; and a second comparator receiving a voltage from the second configuration channel conduit at a first input and said reference voltage at a second input; and a decision logic arranged to receive as inputs said outputs from the first comparator and the second comparator and to output said status depending on said inputs.

Optionally, the charging system comprises an electrical monitor which is arranged to detect a current and/or a voltage associated with the power transmission channel.

Optionally, said electrical monitor comprises a current monitor which measures a current derived from a voltage drop created across a resistive element provided at the power transmission channel and outputs a current signal for the controller.

Optionally, said electrical monitor comprises a voltage monitor which receives a voltage associated with the sink and a voltage associated with the power transmission channel, and is arranged to generate an output signal for the controller based on the received voltages.

Optionally, an output for the controller provided by the electrical monitor comprises either one of the current signal from the current monitor or the output signal from the voltage monitor; or a signal combined from the current signal from the current monitor or the output signal from the voltage monitor.

Optionally, the controller determines that the source and sink have been disconnected directly once it is determined that no configuration channel data is present.

Optionally, the controller is arranged to trigger a special mode of operation of the capacitive power converter in which a voltage associated with the power transmission channel is not back-boosted; and wherein the controller determines that the source and sink have been disconnected once a voltage associated with the power transmission channel crosses a threshold.

Optionally, the special mode is triggered once a lack of configuration channel data is detected.

Optionally, the special mode is triggered based on detection of electrical parameters of the system.

Optionally, the electrical parameters of the system comprise a current through the capacitive power converter and/or a voltage associated with the power transmission channel.

Optionally, the special mode is triggered if a current through the capacitive power converter is near zero amps, or is less than zero amps.

Optionally, the special mode is triggered if a voltage associated with the power transmission channel is very close to, or below, N×VBAT where N is a conversion ratio of the capacitive power converter.

Optionally, the special mode is triggered based on a plurality of conditions being true.

Optionally, the special mode comprises a frequency modulation mode in which a switching frequency of the capacitive power converter is lowered so that the impedance of the capacitive power converter increases.

Optionally, the special mode comprises a pulse skipping mode whereby pulses of the switching of the capacitive power converter are skipped until a voltage associated with the sink is higher than a voltage associated with the power conversion channel scaled by a conversion ratio of the capacitive power converter.

Optionally, the special mode comprises a pulsed current being forced intermittently from the power transmission channel to a ground while the capacitive power converter continues to switch.

Optionally, the bus between the source and sink is provided by a cable.

Optionally, the cable and the bus are compliant with the USB Type-C specification.

BRIEF DESCRIPTION OF THE DRAWINGS

The present disclosure will now be described, by way of example only, with reference to the accompanying drawings, in which.

DESCRIPTION

There are various types of data buses which include a configuration channel (CC), which may be used in the discovery, configuration and management of connections, for example.

According to one aspect of the disclosure, a detachment event can be detected through monitoring data sent over a configuration channel. One example of a type of data bus which uses a configuration channel is that specified in the USB Type-C specification. Using the configuration channel, a USB Type-C interconnect defines a simplified five-volt VBUS-based power delivery and charging solution. This configuration channel is used in the discovery, configuration and management of connections across a USB Type-C cable.

It is appreciated that while this disclosure has particular applicability to USB Type-C connections, it is not limited to these. However, for illustrative purposes we will describe an embodiment which uses USB Type-C connections.

Figure 1:
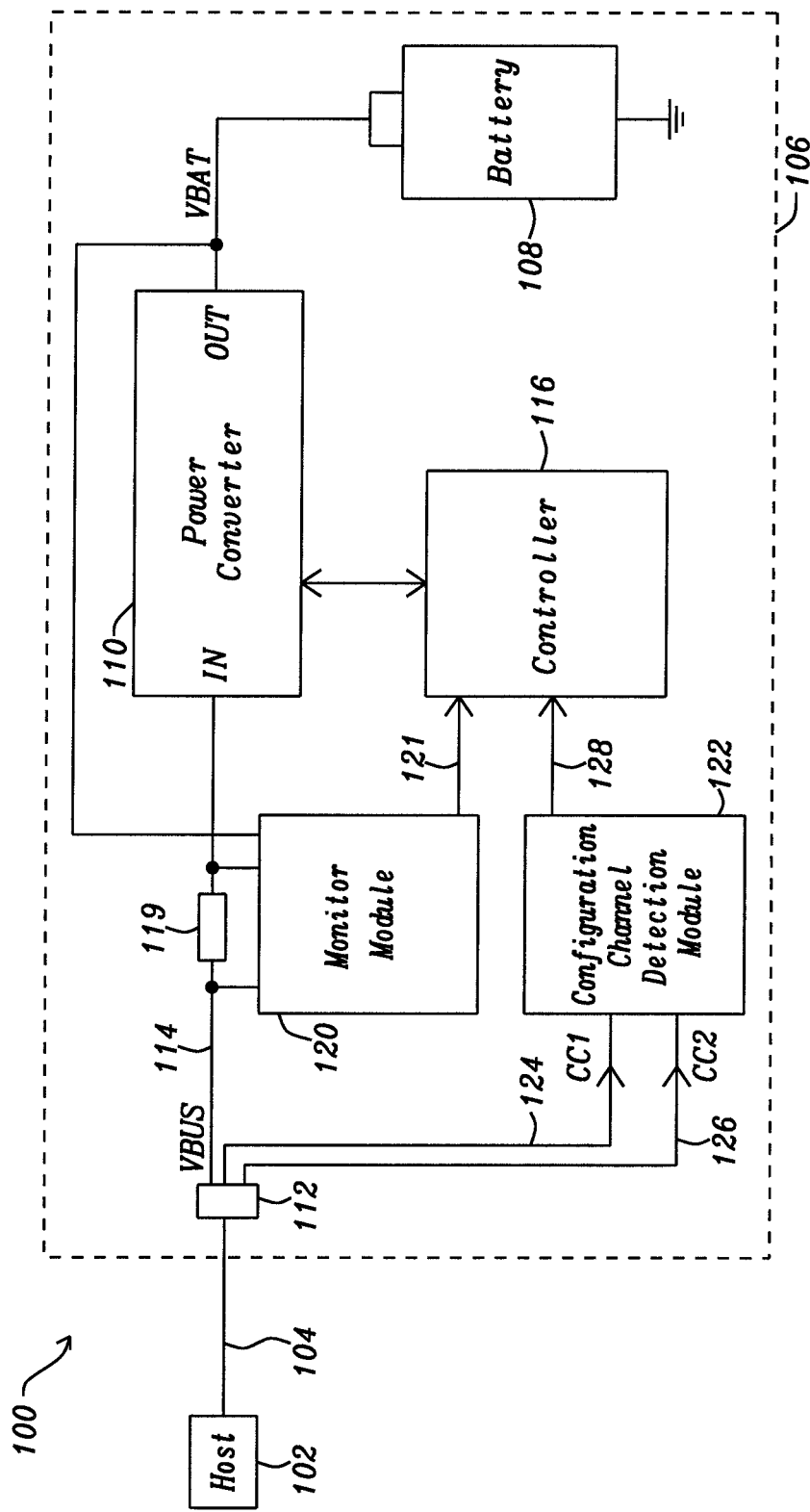
FIG. 1 shows a battery charging system with a capacitive power converter.

A system 100 according to a first embodiment of the disclosure is illustrated in FIG. 1.

Here, a host 102 is connected to a device 106 via a wired connection 104. The device 106 may be provided as a component part of a wider system such as a mobile phone, tablet or other portable device, for example.

The host 102 in this example may comprise a "charging plug", that is, a terminal adaptor (TA) of an AC/DC converter; but it may comprise a DC output of another host device such as a laptop or desktop computer. The device 106 comprises a battery 108 acting as a power sink. An interface 112 receives a USB cable. Power is supplied by a power transmission channel (VBUS) 114 and converted by a capacitive power converter 110 from the voltage VBUS to a voltage VBAT which is suitable for supplying the battery 108.

The capacitive power converter 110 comprises one or more capacitive elements which can store charge; and a set of switching elements which can be selectively configured to charge or discharge the capacitive elements and to couple them between the input (IN) and output (OUT) of the capacitive power converter 110. An example of a power converter is a charge pump. Charge pumps and other types of capacitive power converters are well known, so do not need to described in detail in the present disclosure.

The capacitive power converter 110 operates under instructions provided by a power converter controller 116. The controller 116 sends control signals to the switching elements of the power converter 110 to control the timing of the transfer of charges between the capacitive elements of the power converter 110, to provide an output voltage VOUT equal or close to VIN/N, where N is the transfer ratio of the charge pump.

This system comprises a monitor module 120 which is arranged to monitor the current and/or the voltage of the power communication line 114 and provide that as an input 121 for the controller 116.

Figure 2:
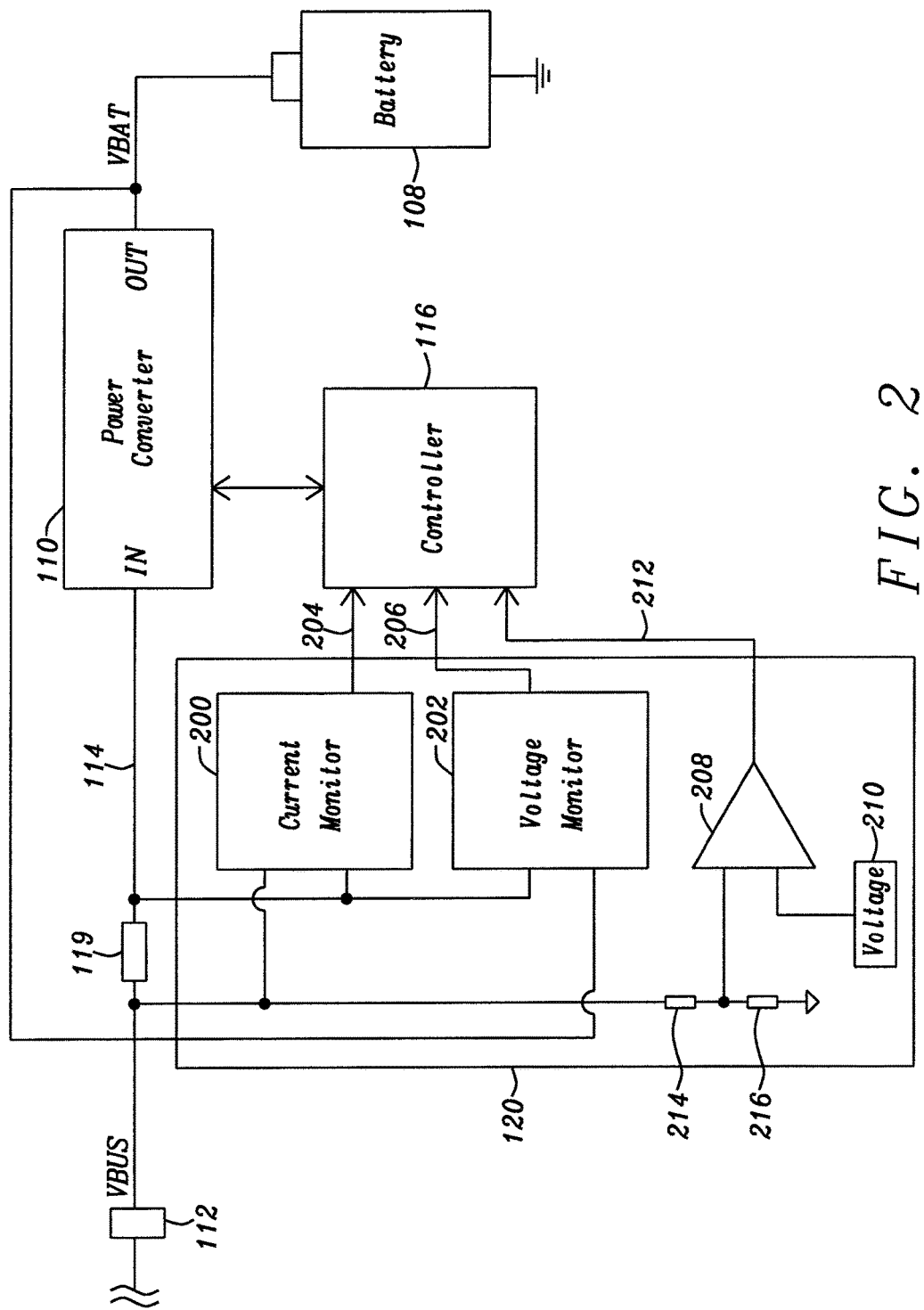
FIG. 2 shows an example of a current and voltage monitor that can be used with the system of FIG. 1.

Selected components of the system of FIG. 1 are shown in FIG. 2, which shows one example of how a monitor module 120 may be configured. The monitor module 120 according to this embodiment comprises a current monitor 200 which measures a current derived from a voltage drop created across resistive element 119 and outputs a current signal 204 for the power converter controller 116; and a voltage monitor 202 which receives VBAT and VBUS as its inputs and outputs a comparison signal 206 for the power converter controller 116. An undervoltage comparator 208 is also provided which compares an input voltage derived from the bus voltage VBUS with a reference voltage provided by a voltage reference 210, and sends an output signal 212 in the event of the input voltage falling below the value of the reference voltage 210. In this embodiment VBUS is divided by resistive elements 214, 216 so that the input to the undervoltage comparator 208 is a scaled version of VBUS.

The current signal 204, comparison signal 206 and undervoltage output signal 212 are represented together in FIG. 1 as a single input 121 for the controller 116 for clarity of illustration; the input 121 may comprise one of the current signal 204, the comparison signal 206 or the undervoltage output signal 212, or any combination of two or all three of these signals 204, 206, 212. Decision logic may be provided as part of the monitor module 120, part of the power converter controller 116 or as a dedicated module for combining the current signal 204, comparison signal 206 and undervoltage output signal 212 to derive related outputs for controlling the capacitive power converter 110.

This system also comprises a configuration channel (CC) detection module 122. In this embodiment (which relates to the USB-C type specification), the CC detection module 122 receives a first input 124 (CC1) and a second input 126 (CC2) from the configuration channels and provides an input 128 for the power converter controller 116. The input 128 may suitably be derived from or related to a voltage drop between the two CC channels CC1, CC2.

Figure 3:
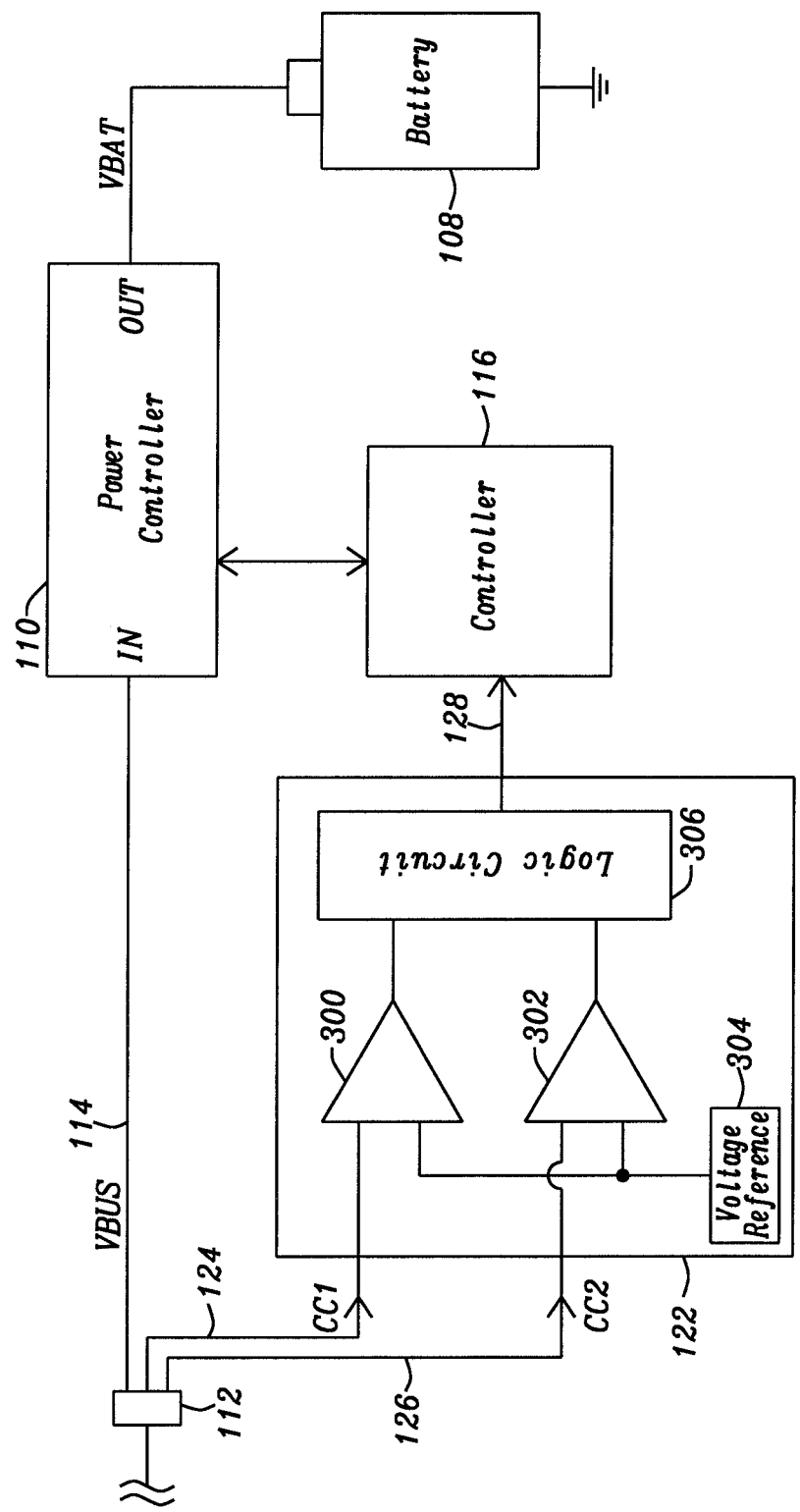
FIG. 3 shows an example of a configuration channel detector that can be used with the system of FIG. 1.

Selected components of the system of FIG. 1 are shown in FIG. 3, which shows one example of how a CC detection module 122 may be configured. The CC detection module 122 according to this embodiment comprises a first comparator 300 and a second comparator 302 which respectively compare a first CC input 124 and a second CC input 126 with a reference voltage VREF provided by a voltage reference source 304. The comparators 300, 302 provide their outputs to a logic circuit 306. This logic circuit 306 can detect, based on the outputs from the comparators 300, 302, whether the voltage on both of the CC lines CC1, CC2 has crossed a threshold as defined by VREF. The output 128 of the logic circuit 306 therefore can give an indication that the CC channel has been disconnected.

In a normal system, the monitor 120 is used to monitor the voltage VBUS of the power transmission channel 114 to detect when a cable is attached or detached. Doing this involves detecting a falling voltage via the undervoltage comparator 208. If VBUS rises above a certain level, the system decides that the adaptor and cable have been attached. In case the voltage VBUS falls below a certain level, then the system decides that the cable has been detached.

However, in the event that the cable 104 is detached while the capacitive power converter 110 is still active (i.e. switching) and has the battery 108 connected to its output, the capacitive power converter 110 will use the battery's energy 108 to back-boost the voltage VBUS and keep its voltage level within expected limits. This will prevent the undervoltage comparator 208 from detecting that the cable has been detached.

Figure 4:
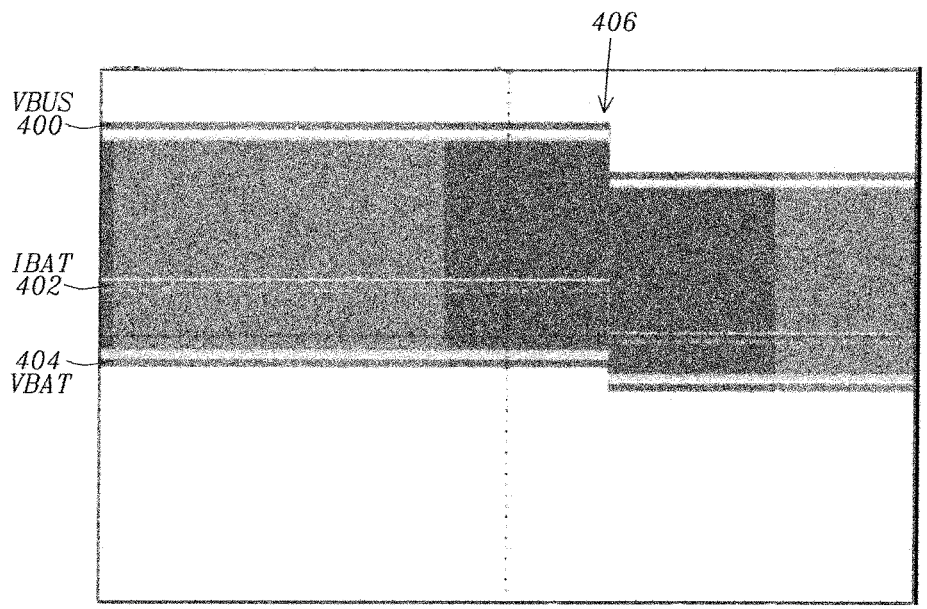
FIG. 4 shows a mode of charging where the capacitive power converter does not stop when a cable is detached, so it back-boosts VBUS to double of battery voltage.

This problem is illustrated in FIG. 4. Here, trace 400 illustrates VBUS, trace 402 illustrates the current supplied to the battery and trace 404 illustrates the voltage applied to the battery. These values are all plotted on an arbitrary scale y-axis against time on the x-axis. A cable detachment event is shown at time 406. Before this time, the battery is charging and the capacitive power converter 110 is switching. After time 406, back-boosting occurs and the switch capacitive power converter 110 still continues to switch.

According to a first aspect of the disclosure, the system 100 has the ability to detect the presence or absence of CC communication on a cable, such as a USB cable. If the cable is being detached, even if VBUS is being boosted by the switched capacitive power converter 110, the circuit will still detect the missing CC communication.

Figure 5:
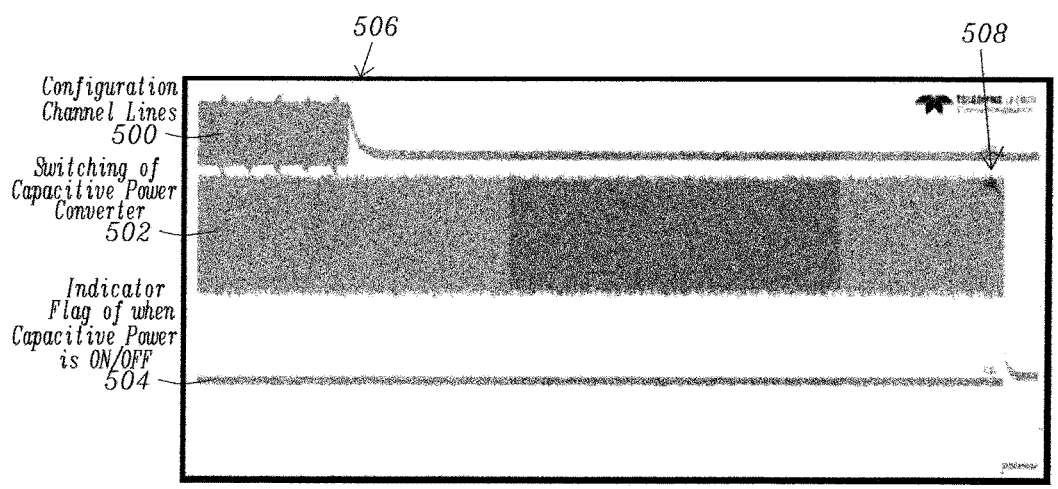
FIG. 5 shows a mode of charging where the capacitive power converter stops switching after a predefined time without CC communication.

This is illustrated in FIG. 5. This shows the activity of the CC lines 500 and the switching of the capacitive power converter 502. Trace 504 shows a flag showing when the capacitive power converter is on (high) or off (low). The current to the battery would go to zero at the moment when the cable is detached. The cable is detached at time 506 and then the charge pump stops operation at time 508. As shown here, the switched capacitive power converter 110 stops switching once CC communication is absent throughout the course of a time period of a predetermined duration, corresponding to the time between events 506 and 508.

Once a cable detachment is detected, the operation of the capacitive power converter 110 can be halted, so that excessive voltage is not built up on the power transmission channel 114 and that dangerous conditions in the mobile device or system that hosts the battery can be avoided. This is achieved by the controller 116, which acts based on its inputs 121, 128 to cease the switching of the capacitive power converter 110.

In a first embodiment, a cable can be determined as being detached once an absence of configuration channel communication is detected. That is, the controller 116 can be configured to cease the switching of the capacitive power converter 110 directly upon detection of a lack of CC communication, even if the voltage VBUS remains high.

However, in some systems a cable detach will still only be detected based on monitoring the voltage VBUS of the power transmission channel 114. This could be due to physical constraints or designer preferences. Thus, according to further embodiments of the disclosure, the CC detection can trigger a special mode of operation of the capacitive power converter 110 in which VBUS is not back-boosted, that is, current is prevented from flowing back from the sink (battery 108) to the power transmission channel 114. The triggered special mode of operation can cause or enable the voltage VBUS associated with the power transmission channel 114 to drop. This means that normal VBUS detection can be used to determine that a cable has been detached. However, because the special mode is triggered based on CC detection, the VBUS voltage is forced or enabled to drop if a cable truly has been detached so the problem of back-boosting is again avoided.

If for some reason a CC detection event does not reliably correlate to a detached cable, then the special modes will not produce a false positive, that is, the voltage VBUS will not cross the relevant threshold even if the special modes are in operation.

There are various conditions that can be used as triggers for entering a special mode of operation of the capacitive power converter 110. For example, the CC detection itself can be used as the basis for triggering a special mode. That is, as soon as a lack of configuration channel communication is detected, a special mode can be entered.

Alternatively, a condition that can be used as a trigger for entering a special mode of operation of the capacitive power converter 110 can be related to or derived from electrical parameters of the system which may include, for example, the current through the capacitive power converter 110 or the level of the power supply real voltage 114.

A special mode may be entered based on conditions related to one of these parameters or to any combination of them. This could be done to reduce the chance of a false positive, for example, a cable detachment could be deemed to have occurred only if two or more of the conditions are met, or if all of them are.

One of the conditions can be that a current through the capacitive power converter is near zero amps, or is less than zero amps (flowing from the battery towards the input). Another of the conditions can be that VBUS is very close to, or below, N×VBAT where N is the conversion ratio of the charge pump.

There are various modes that can be entered that will allow VBUS to drop, i.e., for which back-boosting of the capacitive power converter can be prevented.

One special mode is a frequency modulation mode. In this mode, the switching frequency of the capacitive power converter may be lowered so the impedance of the converter will increase. These means that if a cable is detached the voltage level of VBUS will drop even if only a small current is being sunk from the power supply line 114. Therefore, the VBUS voltage level detection mechanism will work. If the cable is still attached, then it will be able to supply the small current and the system can decide to exit the special mode and continue charging.

A second example of a special mode is to skip pulses of switching of the capacitive power converter until the battery voltage VBAT is higher than VBUS divided by a ratio. This ratio may suitably be the conversion ratio of the capacitive power converter. This means that VBUS or the power supply line 114 is not supplied from the battery any more, and so the voltage level drops below the cable detach detection level. If the cable is still attached, it will not allow VBUS to drop so that the capacitive power converter may resume its normal operation.

Figure 6:
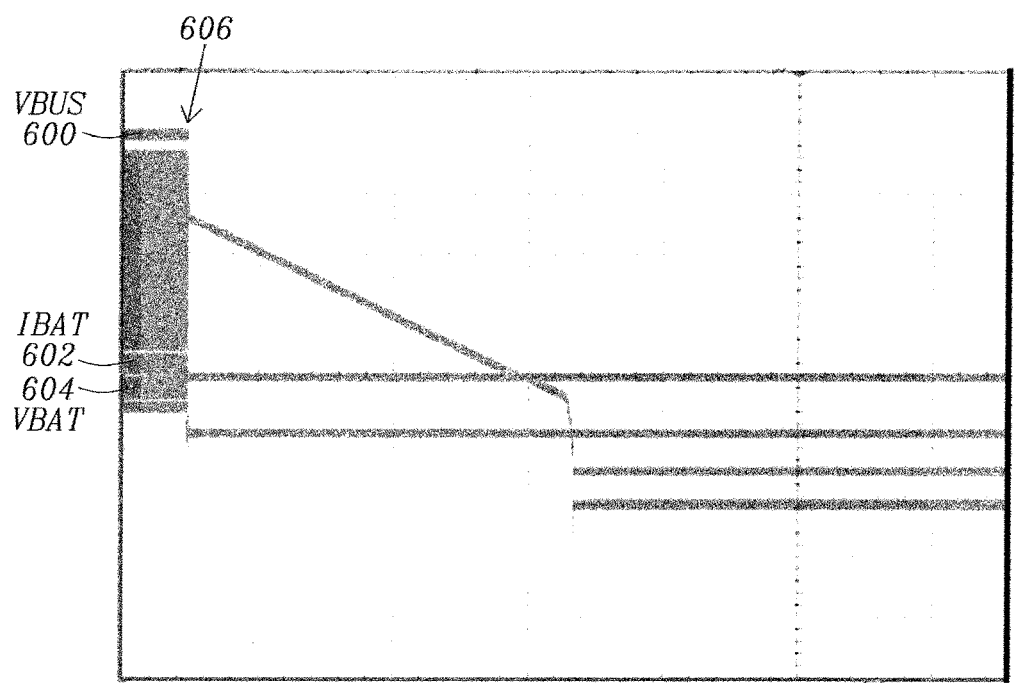
FIG. 6 shows a mode of charging where the capacitive power converter enters in "skip mode" when it detects the battery current is close to 0A.

FIG. 6 illustrates this with traces 400 showing VBUS, 602 showing IBAT and 604 showing VBAT. A cable detach event occurs at time 606. In this illustration, the capacitive power converter enters into a skip mode when it detects that the battery current 602 is close to zero amps. This allows VBUS to drop and the VBUS voltage monitor detects the cable detachment. If the cable has not in fact been detached VBUS would be higher held and the charge pump or switched capacitor converter would exit the special mode after a predefined time period.

A third example of a special mode is for a pulsed current to be forced intermittently from VBUS to ground while the capacitive power converter continues to switch. This will make VBUS drop enough to be detected by the voltage monitor 120. If the cable is still attached it will not allow VBUS to drop so the charge pump can resume its regular operation.

Various improvements and modifications could be made to the above without departing from the scope of the disclosure.

What is claimed is:

1. A charging system for providing power over a bus between a source and a sink;
    said bus comprising a power transmission channel and a configuration channel;
    said system comprising:
        a capacitive power converter;
        a controller for controlling operation of the capacitive power converter;
        a configuration channel detector arranged to detect the status of the configuration channel and provide said status as an input for the controller, so that the system can determine that the source has been detached from the bus when no configuration channel data is present.

2. The charging system of claim 1, wherein the configuration channel detector is arranged to detect a voltage associated with the configuration channel and said status is detected and provided based on when the detected voltage crosses a predetermined threshold.

3. The charging system of claim 2, wherein the configuration channel comprises a first configuration channel conduit and a second configuration channel conduit; and the configuration channel detector detects a first voltage associated with said first configuration channel conduit and a second voltage associated with said second configuration channel conduit, and provides said status based on said detected first voltage and said detected second voltage.

4. The charging system of claim 2, wherein the configuration channel detector comprises a first comparator receiving a voltage from the first configuration channel conduit at a first input and a reference voltage at a second input; and a second comparator receiving a voltage from the second configuration channel conduit at a first input and said reference voltage at a second input; and a decision logic arranged to receive as inputs said outputs from the first comparator and the second comparator and to output said status depending on said inputs.

5. The charging system of claim 1, comprising an electrical monitor which is arranged to detect a current and/or a voltage associated with the power transmission channel.

6. The charging system of claim 5, wherein said electrical monitor comprises a current monitor which measures a current derived from a voltage drop created across a resistive element provided at the power transmission channel and outputs a current signal for the controller.

7. The charging system of claim 5, wherein said electrical monitor comprises a voltage monitor which receives a voltage associated with the sink and a voltage associated with the power transmission channel, and is arranged to generate an output signal for the controller based on the received voltages.

8. The charging system of claim 7, wherein an output for the controller provided by the electrical monitor comprises either one of the current signal from the current monitor or the output signal from the voltage monitor; or a signal combined from the current signal from the current monitor or the output signal from the voltage monitor.

9. The charging system of claim 1, wherein the controller determines that the source and sink have been disconnected directly once it is determined that no configuration channel data is present.

10. The charging system of claim 1, wherein the controller is arranged to trigger a special mode of operation of the capacitive power converter in which a voltage associated with the power transmission channel is not back-boosted; and wherein the controller determines that the source and sink have been disconnected once a voltage associated with the power transmission channel crosses a threshold.

11. The charging system of claim 10, wherein the special mode is triggered once a lack of configuration channel data is detected.

12. The charging system of claim 10, wherein the special mode is triggered based on detection of electrical parameters of the system.

13. The charging system of claim 12, wherein the electrical parameters of the system comprise a current through the capacitive power converter and/or a voltage associated with the power transmission channel.

14. The charging system of claim 13, wherein the special mode is triggered if a current through the capacitive power converter is near zero amps, or is less than zero amps.

15. The charging system of claim 14, wherein the special mode is triggered if a voltage associated with the power transmission channel is very close to, or below, N×VBAT where N is a conversion ratio of the capacitive power converter.

16. The charging system of claim 10, wherein the special mode is triggered based on a plurality of conditions being true.

17. The charging system of claim 10, wherein the special mode comprises a frequency modulation mode in which a switching frequency of the capacitive power converter is lowered so that the impedance of the capacitive power converter increases.

18. The charging system of claim 10, wherein the special mode comprises a pulse skipping mode whereby pulses of the switching of the capacitive power converter are skipped until a voltage associated with the sink is higher than a voltage associated with the power conversion channel scaled by a conversion ratio of the capacitive power converter.

19. The charging system of claim 10, wherein the special mode comprises a pulsed current being forced intermittently from the power transmission channel to a ground while the capacitive power converter continues to switch.

20. The charging system of claim 1, wherein the bus between the source and sink is provided by a cable.

21. The charging system of claim 20, wherein the cable and the bus are compliant with the USB Type-C specification.

22. A charging method for providing power over a bus between a source and a sink;
    said bus comprising a power transmission channel and a configuration channel;
    said system comprising the steps of:
        providing a capacitive power converter;
        controlling operation of the capacitive power converter with a controller;
        arranging a configuration channel detector to detect the status of the configuration channel and provide said status as an input for the controller, so that the system can determine that the source has been detached from the bus when no configuration channel data is present.

23. The charging method of claim 22, wherein the configuration channel detector is arranged to detect a voltage associated with the configuration channel and said status is detected and provided based on when the detected voltage crosses a predetermined threshold.

24. The charging method of claim 23, wherein the configuration channel comprises a first configuration channel conduit and a second configuration channel conduit; and the configuration channel detector detects a first voltage associated with said first configuration channel conduit and a second voltage associated with said second configuration channel conduit, and provides said status based on said detected first voltage and said detected second voltage.

25. The charging method of claim 23, wherein the configuration channel detector comprises a first comparator receiving a voltage from the first configuration channel conduit at a first input and a reference voltage at a second input; and a second comparator receiving a voltage from the second configuration channel conduit at a first input and said reference voltage at a second input; and a decision logic arranged to receive as inputs said outputs from the first comparator and the second comparator and to output said status depending on said inputs.

* * * * *